(12) United States Patent
Takii et al.

(10) Patent No.: US 7,036,964 B2
(45) Date of Patent: May 2, 2006

(54) VEHICLE HEADLAMP APPARATUS AND METHOD OF SETTING OPTICAL AXIS POSITION THEREOF

(75) Inventors: Naoki Takii, Shizuoka (JP); Masahiro Kusagaya, Shizuoka (JP); Atsushi Sugimoto, Shizuoka (JP); Junji Baba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 235 days.

(21) Appl. No.: 10/656,508

(22) Filed: Sep. 5, 2003

(65) Prior Publication Data

US 2004/0057243 A1 Mar. 25, 2004

(30) Foreign Application Priority Data

Sep. 20, 2002 (JP) ............................. 2002-274620

(51) Int. Cl.
*F21W 101/10* (2006.01)

(52) U.S. Cl. ..................... 362/465; 362/466; 362/531; 362/532

(58) Field of Classification Search .................. 362/43, 362/464, 465, 466, 467, 512, 531, 532
See application file for complete search history.

(56) References Cited

U.S. PATENT DOCUMENTS 6,302,553 B1 * 10/2001 Izawa ........................... 362/37

| | | | |
|---|---|---|---|
| 2002/0163814 A1 * | 11/2002 | Hayami et al. | |
| 2002/0163815 A1 | 11/2002 | Hayami | |
| 2003/0039124 A1 * | 2/2003 | Tawa et al. | |
| 2004/0057240 A1 * | 3/2004 | Baba et al. | |

FOREIGN PATENT DOCUMENTS

| GB | 2375386 | 11/2002 |
|---|---|---|
| GB | 2375387 | 11/2002 |
| JP | 2002-160581 | 6/2002 |
| JP | 2002-326535 | 11/2002 |
| JP | 2002-326536 | 11/2002 |

\* cited by examiner

*Primary Examiner*—Laura K. Tso
(74) *Attorney, Agent, or Firm*—Fish & Richardson P.C.

(57) ABSTRACT

A headlamp apparatus for a vehicle includes a left-right deflecting device for deflecting an optical axis of illumination of a projector lamp in a left-and-right direction in correspondence with a steering angle of a vehicle; a vertically deflecting device for deflecting the optical axis of illumination of the projector lamp 30 in a vertical direction; and a deflection controlling device for effecting the operation of setting the optical axis by the left-right deflecting device at a time when the optical axis of illumination is in a state of being oriented in a lower direction than the horizontal direction by the vertically deflecting device. The optical axis position of the projector lamp is oriented in a lower direction than the horizontal direction by the vertically deflecting device until the optical axis position is set to a reference angular position by the left-right deflecting device.

7 Claims, 12 Drawing Sheets

VERTICAL DIRECTION

LEFT-AND-RIGHT DIRECTION

TWO-SIDED ABUTMENT SYSTEM

ONE-SIDED ABUTMENT SYSTEM

VEHICLE HEADLAMP APPARATUS AND METHOD OF SETTING OPTICAL AXIS POSITION THEREOF

BACKGROUND OF THE INVENTION

The present invention relates to a headlamp apparatus for a vehicle such as an automobile. More particularly, the present invention concerns a headlamp apparatus for a vehicle and a method of setting its optical axis position which make it possible to set the optical axis of a headlamp to a reference angular position with high accuracy in a headlamp apparatus equipped with a light-distribution controlling means for changing the illuminating direction or the illuminating range of the headlamp in a following manner in correspondence with the traveling conditions, e.g., an adaptive front-lighting system (hereafter AFS).

As the AFS which has been proposed to enhance the traveling safety of the automobile, a technique disclosed in JP-A-2002-160581 proposed by the present applicant is known. In this AFS, information indicating the traveling conditions of an automobile CAR is detected by sensors 1, and their detection outputs are outputted to an electronic control unit (hereafter ECU), as shown in a conceptual diagram in FIG. 1. As the sensors 1, there are provided, for instance, a steering sensor 1A for detecting the steering angle of a steering wheel SW of the automobile CAR, a vehicle speed sensor 1B for detecting the vehicle speed of the automobile CAR, and vehicle height sensors 1C (only the sensor for the rear axle is shown) for detecting the respective height of front and rear axles for detecting the horizontal state (leveling) of the automobile CAR. These sensors 1A, 1B, and 1C are connected to the ECU 2. On the basis of the outputs from the inputted sensors 1, the ECU 2 controls swivel lamps 3R and 3L respectively installed on the left- and right-hand sides of a front portion of the automobile, i.e., headlamps 3 whose light distribution characteristics can be changed through deflection control of the illuminating direction in the left-and-right direction. As such a swivel lamp 3R, 3L, one is known which is equipped with a rotatively driving means for rotatively driving a reflector or a projector lamp provided in the headlamp by a driving source such as a drive motor as a construction capable of rotating the reflector or the projector lamp in the horizontal direction. The mechanism including this rotatively driving means is called herein an actuator. According to this type of AFS, when the automobile travels on a curved road, it becomes possible to illuminate the road ahead of the curve in correspondence with the traveling speed of the automobile, which is effective in enhancing the traveling safety.

To realize appropriate illumination in such an AFS, it is necessary for the steering angle of the steering wheel and the deflection angle of the swivel lamp to correspond to each other properly. When this correspondence fails to be obtained, the following problems of traveling safety occur: Namely, it becomes impossible for the beam of the swivel lamp to illuminate the direction desirable for the traveling direction of the automobile, e.g., the road ahead when the automobile travels straight ahead or around a curve, or the beam is deflected toward the opposite lane and dazzles the driver of an oncoming vehicle.

For this reason, with the conventional AFS, when the ignition switch of the automobile is turned on, initialization is carried out whereby the swivel lamp is oriented to a predetermined reference angular position, normally in a straightly advancing direction of the automobile. If such initialization is carried out, it becomes possible to obtain correspondence between the steering angle of the steering wheel SW and the deflection angle of the swivel lamp, and it subsequently becomes possible to effect appropriate deflection operation of the swivel lamp by using this initialized reference angular position as a reference. Incidentally, to initialize the swivel lamp, it is necessary to detect the present deflection angle of the swivel lamp. For this reason, this type of actuator is conventionally provided with a deflection angle detector for detecting the deflection angle of a rotating output shaft of the actuator which is in a corresponding relationship with the deflection angle of the swivel lamp. For example, a potentiometer is disposed for the output shaft of the rotatively driving means for rotatively driving the swivel lamp, and the rotational angle of the output shaft, i.e., the deflection angle, is detected from the output of this potentiometer.

However, the provision of such a potentiometer constitutes a factor making the structure of the actuator complex and large in size, and is therefore unfavorable. For this reason, it has been conceived to detect the deflection angle of the swivel lamp by detecting the rotational angle of the drive motor which is a driving source of the rotatively driving means of the actuator. Hall elements or Hall ICs (hereafter referred to as Hall elements) for outputting pulse signals in a number corresponding to the amount of rotation of the drive motor have been used as a rotational-angle detector designed for this purpose. Namely, as the pulse signals from the Hall elements outputted in conjunction with the rotating operation of the drive motor are counted, the deflection angle of the actuator is indirectly detected so as to realize appropriate control of the AFS.

In addition, the initialization of the swivel lamp is conventionally effected by making use of the pulse signals from the Hall elements. For example, the swivel lamp is rotated until it abuts in one direction, i.e., upto the position of the maximum deflection angle. At the same time as the swivel lamp is rotated from this rotational position in the opposite direction, the counting of the pulse signals from the Hall elements is started, and the rotation is stopped when predetermined pulse signals have been counted. Accordingly, if the correlation between the count of the pulse signals and the deflection angle of the swivel lamp is determined in advance, it becomes possible to rotate the swivel lamp from the abutment position by a predetermined deflection angle on the basis of the count of the pulse signals. Thus it becomes possible to set the swivel lamp to a predetermined reference angular position, i.e., in the straightly advancing direction in this case.

Incidentally, the present inventors have studied the application of this type of AFS to an automobile equipped with a leveling mechanism, i.e., an automobile equipped with a leveling mechanism for detecting the inclination of the automobile in the vertical direction by detecting the vehicle height concerning the front wheels and rear wheels of the automobile and for adjusting the deflection angle of the headlamp in the vertical direction in correspondence thereto. Moreover, in this case, the present inventors have also studied the setting of the swivel lamp to a reference angular position in the vertical direction at the same time as the setting in the left-and-right direction during the initialization of the swivel lamp. For example, this is an attempt to set the swivel lamp to reference angular positions in the left-and-right and vertical directions by operating the leveling mechanism at the same time as the actuator for setting the reference angular position in the left-and-right direction is operated. Here, the horizontal direction is normally selected as the reference angular position in the vertical direction.

However, in the case where an attempt is thus made to simultaneously effect the setting of the reference angular positions in the left-and-right direction and the vertical direction, there are cases where the optical axis of illumination is oriented toward the oncoming vehicle side at the time of setting the reference angular position of the swivel lamp in the left-and-right direction. At this time, if the optical axis of illumination of the swivel lamp in the vertical direction is oriented in the horizontal direction or a direction higher than that by the leveling mechanism, there is a possibility of dazzling the driver of the oncoming vehicle. Accordingly, it is required to initialize the swivel lamp in a state in which the dazzling of the oncoming vehicle is prevented.

SUMMARY OF THE INVENTION

The object of the invention is to provide a headlamp apparatus for a vehicle and a method of setting its optical axis position which ensure appropriate control of the AFS by preventing the dazzling of the oncoming vehicle at the time of the initialization operation of the AFS.

The headlamp apparatus for a vehicle in accordance with the invention is a headlamp apparatus for a vehicle including left-right deflecting means for deflecting an optical axis of illumination of a headlamp in a left-and-right direction in correspondence with a steering angle of a vehicle and vertically deflecting means for deflecting the optical axis of illumination of the headlamp in a vertical direction, characterized by comprising deflection controlling means for effecting the operation of setting the optical axis of the headlamp by the left-right deflecting means at a time when the optical axis of illumination of the headlamp is in a state of being oriented in a lower direction than the horizontal direction by the vertically deflecting means.

In addition, the method of setting an optical axis position of a headlamp apparatus for a vehicle is a method of setting an optical axis position of a headlamp apparatus for a vehicle including left-right deflecting means for deflecting an optical axis of illumination of a headlamp in a left-and-right direction in correspondence with a steering angle of a vehicle and vertically deflecting means for deflecting the optical axis of illumination of the headlamp in a vertical direction, characterized by comprising the steps of: effecting the operation of setting the optical axis by the left-right deflecting means at a time when the optical axis of illumination of the headlamp is in a state of being oriented in a lower direction than the horizontal direction by the vertically deflecting means at the time of setting the optical axis position of the headlamp to a reference angular position; and completing the operation of setting the optical axis by the vertically deflecting means after completion of the operation of setting the optical axis by the left-right deflecting means. For example, after starting the operation of the vertically deflecting means, the operation of the left-right deflecting means is started after the lapse of a first predetermined time. In addition, after starting the deflecting operation of the vertically deflecting means in a downwardly oriented manner, the deflecting operation of the vertically deflecting means in an upwardly oriented manner is started after the lapse of a second predetermined time.

In accordance with the invention, the optical axis position of the headlamp is oriented in a lower direction than the horizontal direction by the vertically deflecting means until the optical axis position of the headlamp is set to the reference angular position by the left-right deflecting means. After the optical axis position of the headlamp is set to the reference angular position by the left-right deflecting means, the optical axis position is set to a reference position. Consequently, it is possible to prevent the headlamp from being deflected toward the oncoming vehicle side when the optical axis position is being oriented in the horizontal direction or in an upward direction. Hence, it is possible to prevent the dazzling of the driver of an oncoming vehicle during the operation of setting the optical axis position, thereby making it possible to ensure appropriate control of the AFS.

BRIEF DESCRIPTION OF THE DRAWINGS

FIG. 10 is a flowchart for executing the initialization of a projector lamp when an ignition switch is turned on.

DETAILED DESCRIPTION OF THE PREFERRED EMBODIMENTS

Figure 2:
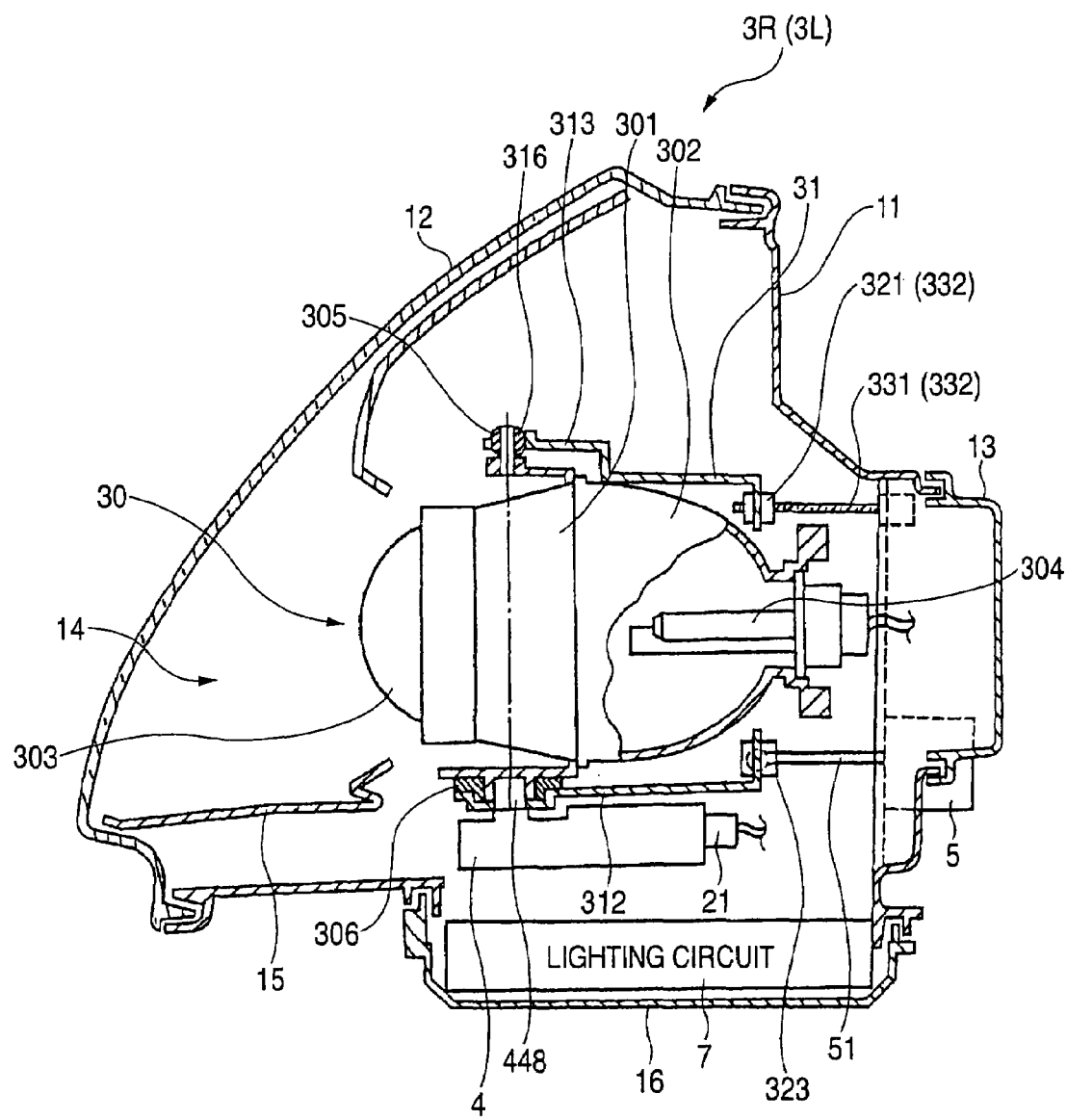
FIG. 2 is a vertical cross-sectional view of a swivel lamp.
Figure 3:
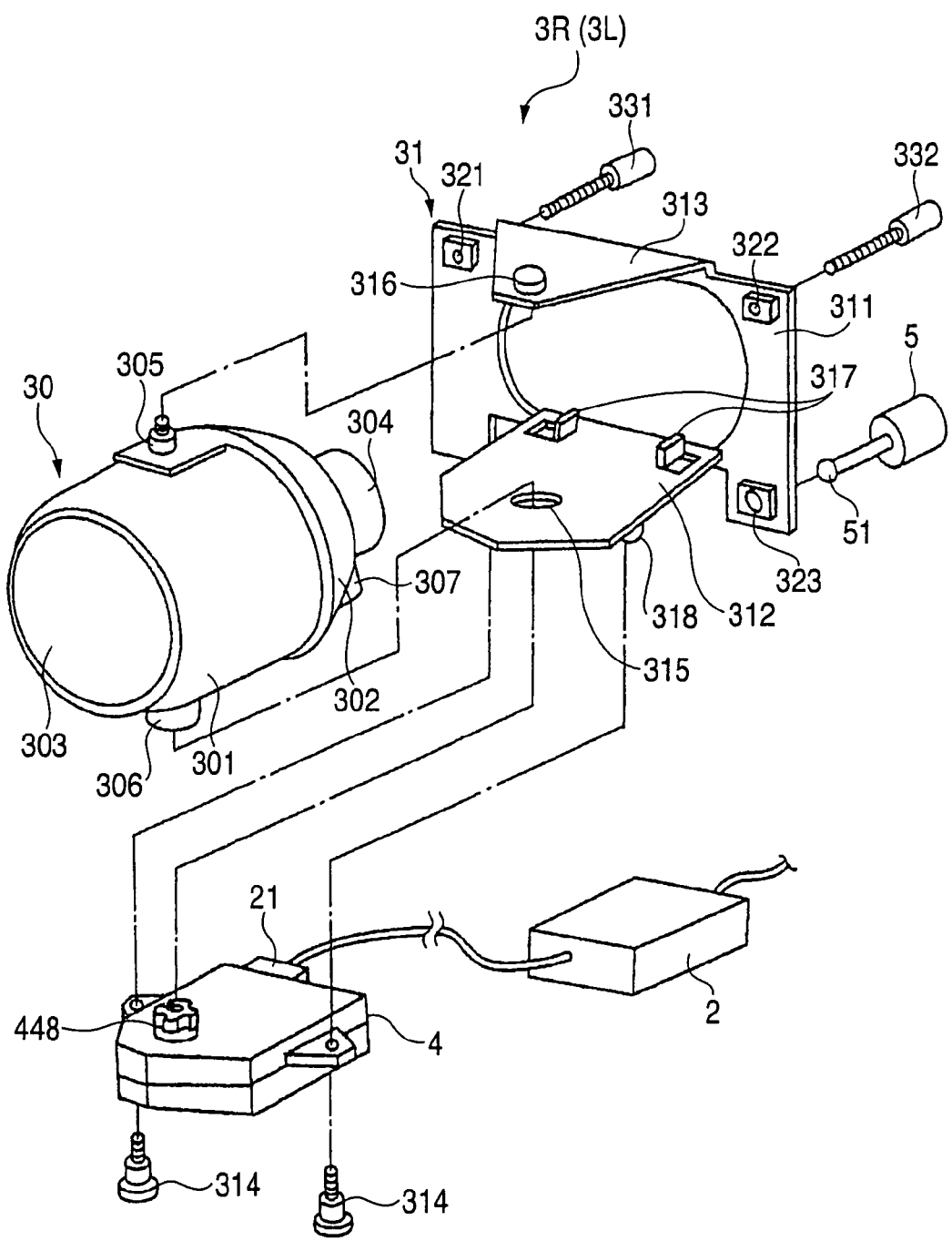
FIG. 3 is an exploded perspective view of principal portions of the internal structure of the swivel lamp.

Referring now to the drawings, a description will be given of an embodiment of the invention. FIG. 2 is a cross-sectional view of an internal structure of a headlamp constituted by a swivel lamp whose illuminating direction is deflectable in the transverse direction. FIG. 3 is a partial exploded perspective view of principal portions thereof. A lens 12 is fitted in a front opening of a lighting apparatus body 11, and a rear cover 13 is fitted in a rear opening, thereby forming a light chamber 14. A projector lamp 30 is disposed in the light chamber 30. The projector lamp 30 has a sleeve 301, a reflector 302, a lens 303, and a light source 304 which are formed as a unit. Since the projector lamp 30 is of a kind which has already been widely used, a detailed description thereof will be omitted, but a discharge bulb is used as the light source 304 in this example. The projector lamp 30 is supported by a bracket 31 which is substantially U-shaped. In addition, an extension 15 is disposed around the projector lamp 30 inside the lighting apparatus body 11 so that the interior will not be exposed through the lens 12. Further, in this embodiment, a lighting circuit 7 for lighting the discharge bulb of the projector lamp 30 is interiorly fitted by making use of a lower cover 16 fitted in a bottom opening of the lighting apparatus body 11.

The projector lamp 30 is supported in a state in which it is clamped between a lower plate 312 and an upper plate 313 which are formed by orthogonally bending a vertical plate 311 of the bracket 31. An actuator 4, which will be described later, is fixed to a lower side of the lower plate 312 by means of screws 314, and a rotating output shaft 448 of the actuator 4 projects to the upper side through a shaft hole 315 formed in the lower plate 312. The screws 314 are screwed down to bosses 318 projecting from a lower surface of the lower plate 312. A shaft portion 305 provided on an upper surface of the projector lamp 30 is fitted in a bearing 316 provided on the upper plate 313. A connecting portion 306 provided on a lower surface of the projector lamp 30 is fitted and connected to the rotating output shaft 448 of the actuator 4. As a result, the projector lamp 30 is rotatable in the transverse direction with respect to the bracket 31, and is rotatively operated in the horizontal direction integrally with the rotating output shaft 448 by the operation of the actuator 4, as will be described later.

Here, aiming nuts 321 and 322 are integrally attached to upper left and right portions of the bracket 31, as viewed from the front side, and a leveling bearing 323 is integrally attached to a lower portion on the right-hand side. A horizontal aiming screw 331 and a vertical aiming screw 332, which are axially rotatably supported by the lighting apparatus body 11, are respectively threadedly engaged with the aiming nuts 321 and 322. Further, a leveling ball 51 of a leveling mechanism 5, which is supported by the lighting apparatus body 11, is fitted in the leveling bearing 323. By virtue of this construction, as the horizontal aiming screw 331 is axially rotatably operated, the bracket 31 can be rotated in the horizontal direction by using as a fulcrum a line connecting the aiming nut 322 and the leveling bearing 323 on the right-hand side. Further, as the horizontal aiming screw 331 and the vertical aiming screw 332 are axially rotatably operated simultaneously, the bracket 31 can be rotated in the vertical direction by using the leveling bearing 323 as a fulcrum. Furthermore, as the leveling mechanism 5 is operated, the leveling ball 51 is moved back and forth in the axial direction, so that the bracket 31 can be rotated in the vertical direction by using as a fulcrum a line connecting the left and right aiming nuts 321 and 322. This permits aiming adjustment for adjusting the optical axis of the projector lamp 30 in the left-and-right direction and in the vertical direction, as well as leveling adjustment for adjusting the optical axis of the projector lamp in the vertical direction in correspondence with a leveling state accompanying a change in the height of the automobile. It should be noted that a projection 307 projects from a lower surface of the reflector 302 of the projector lamp 30, and, on the lower plate 312 of the bracket 31 opposing thereto, a pair of stoppers 317 are respectively formed at left and right positions by being cut out. The arrangement provided is such that as the projection 307 is brought into colliding contact with either one of the stoppers 317 in consequence of the rotation of the projector lamp 30, the rotational range of the projector 30 is restricted.

Figure 4:
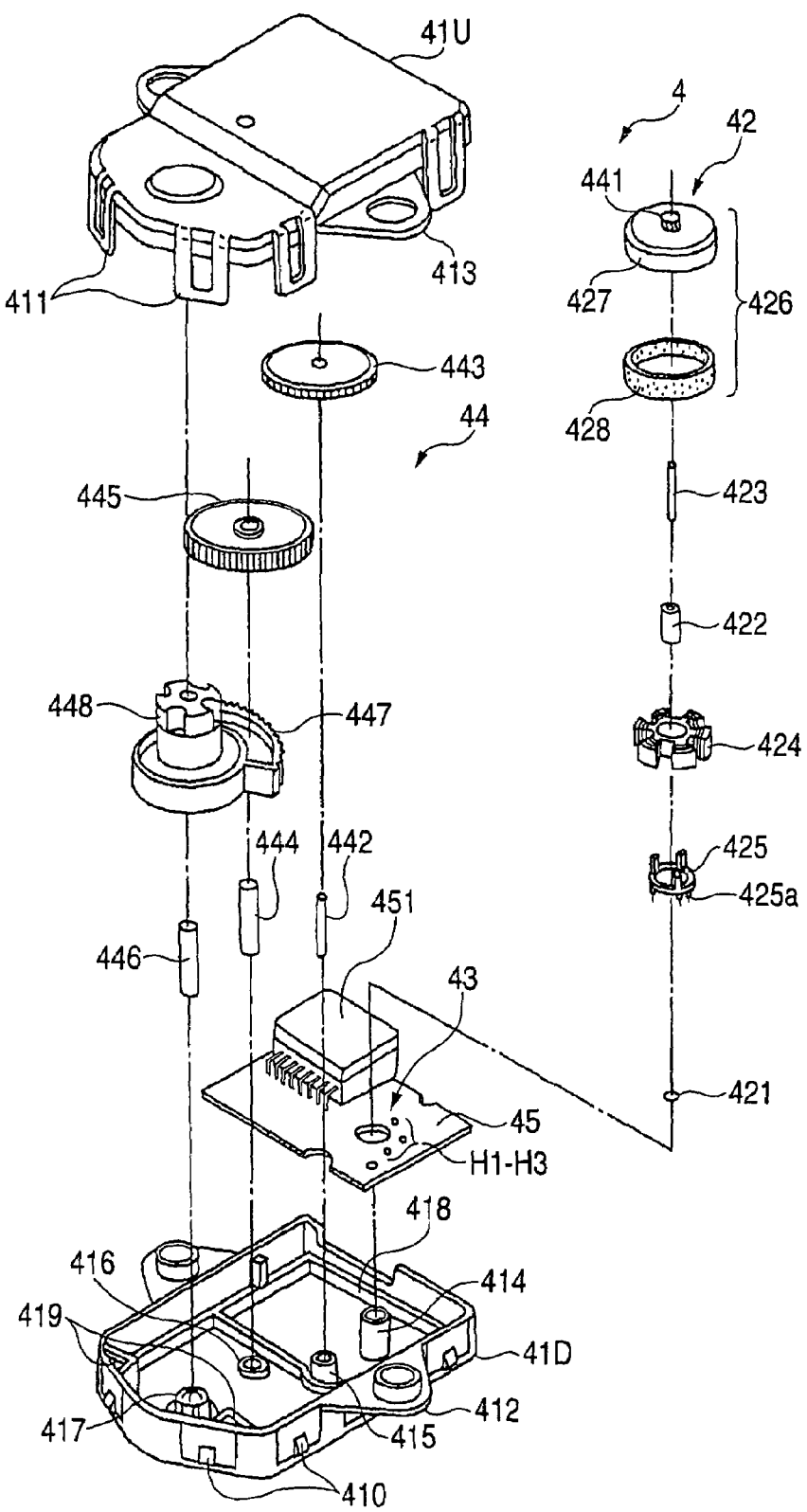
FIG. 4 is a partial exploded perspective view of an actuator.
Figure 5:
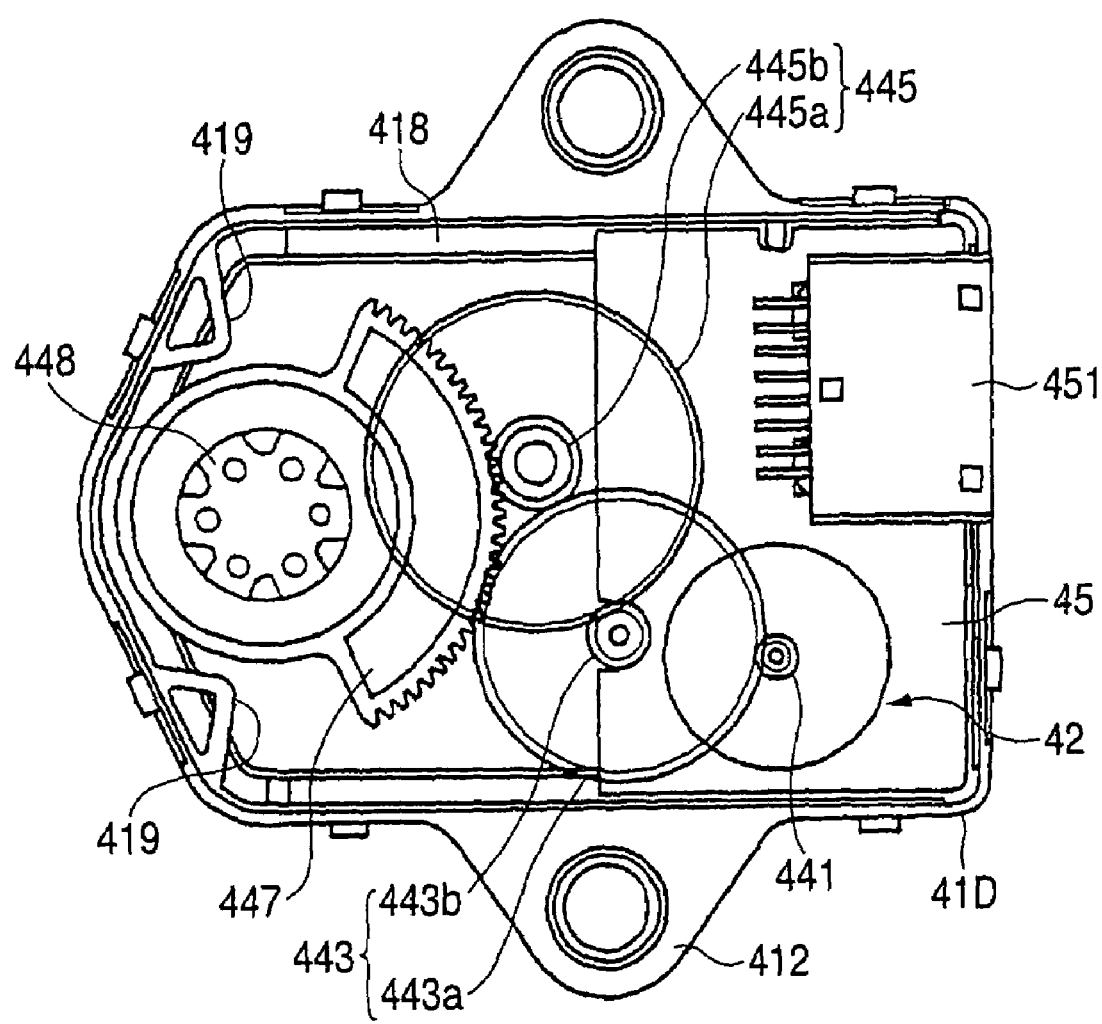
FIG. 5 is a schematic plan view of the actuator.
Figure 6:
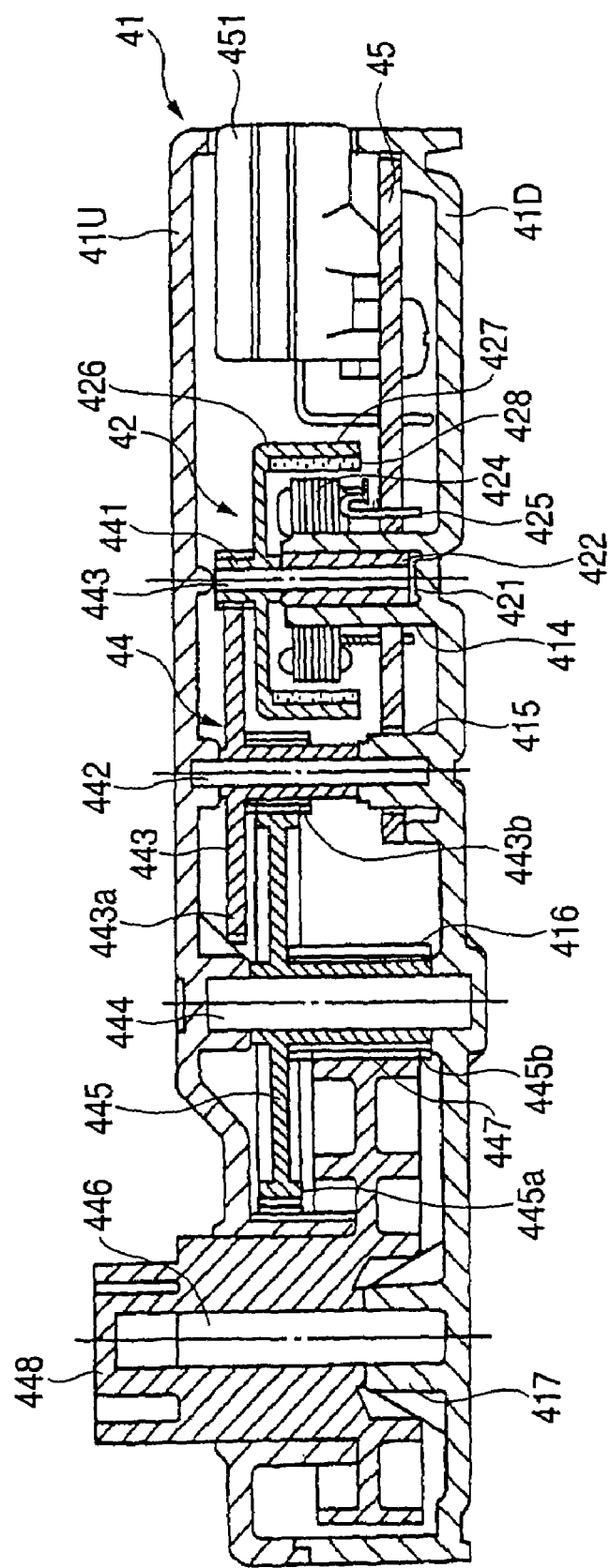
FIG. 6 is a vertical cross-sectional view of the actuator.

FIG. 4 is an exploded perspective view of essential portions of the actuator 4 for swiveling each swivel lamp 3R, 3L. FIG. 5 is a schematic plan view of an assembled state thereof. FIG. 6 is a vertical cross-sectional view thereof. A housing 41 is comprised of a lower half 41D and an upper half 41U which are each formed in the shape of a dish close to a pentagon. A plurality of projections 410 projectingly provided on the peripheral surface of the lower half 41D and a plurality of retainers 411 suspended downward from the peripheral surface of the upper half 41U are fitted to each other, thereby forming a housing chamber. In addition, supporting lugs 412 and 413 are respectively provided on both side surfaces of the upper half 41U and the lower half 41D in such a manner as to project toward both sides. These supporting lugs 412 and 413 are used to fix the housing 41 to the bosses 318 of the bracket 31 by means of the screws 314. Further, the rotating output shaft 448 having a spline structure projects from the upper surface of the housing 41, and is connected to the connecting portion 306 on the bottom surface of the projector lamp 30. In addition, a connector 451 is disposed on the rear surface of the housing 41, and an external connector 21 (see FIG. 2) connected to an ECU 2 is adapted to be fitted to the connector 451.

Four hollow bosses 414, 415, 416, and 417 are uprightly provided on the inner bottom surface of the lower half 41D of the housing 41 at required positions. As a drive motor, a brushless motor 42, which will be described later, is assembled to the first hollow boss 414. Further, shafts of gear mechanisms 44 are inserted and supported in the second to fourth hollow bosses 415, 416, and 417, as will be described later. In addition, stepped ribs 418 are integrally formed along peripheral edges of the inner bottom surface of the lower half 41D, and a printed circuit board 45 is mounted on the stepped ribs 418 in a state in which its peripheral edge portions abut against them. The printed circuit board 45 is installed and supported in the housing 41 in a state in which the printed circuit board 45 is clamped between downwardly oriented ribs provided on the upper half 41 and not shown in the drawings and the aforementioned stepped ribs 418. The first hollow boss 414 is passed through this printed circuit board 45, and the brushless motor 42 which is assembled is electrically connected to the printed circuit board 45. In addition, various electronic components, which serve as a control circuit 43 to be described later and are not illustrated in the drawings, and the connector 451 are mounted on the printed circuit board 45.

Figure 7:
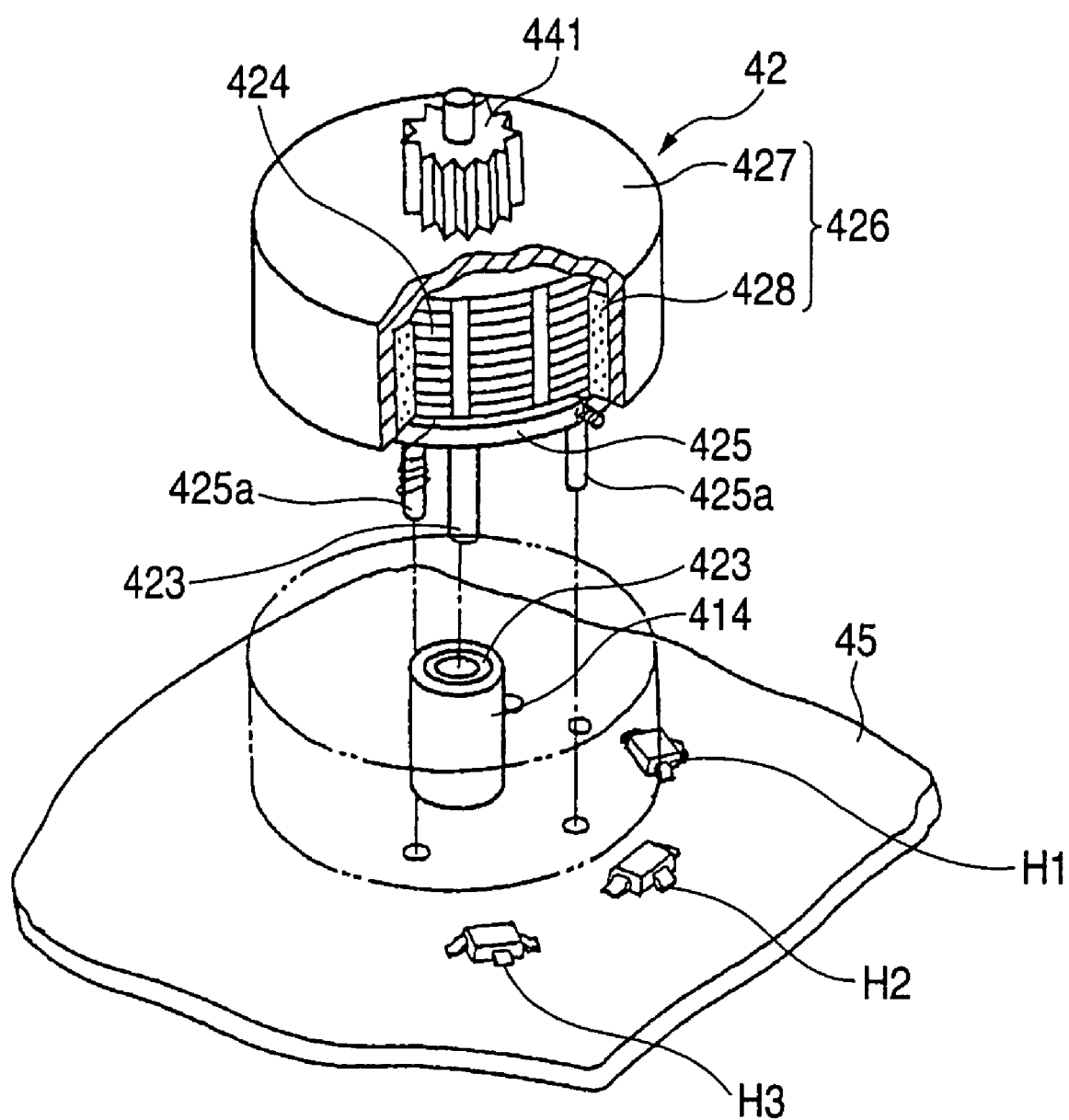
FIG. 7 is an enlarged perspective view of a portion of a brushless motor.

As shown in the partially broken-away perspective view in FIG. 7, a rotating shaft 423 is axially rotatably supported in the first hollow boss 414 of the lower half 41D by means of a thrust bearing 421 and a sleeve bearing 422. Also, stator coils 424, which include circumferentially equally distributed three pairs of coils, are fixedly supported in the first hollow boss 414. The stator coils 424 are electrically connected to the printed circuit board 45 to supply electricity. Here, the stator coils 424 are assembled integrally with a core base 425, and the arrangement adopted is such that the stator coils 424 are electrically connected to the printed circuit board 45 by making use of terminals 425*a* provided on this core base 425. Further, a rotor 426 shaped in the form of a cylindrical container is fixedly attached to an upper end portion of the rotating shaft 423 in such a manner as to cover the stator coils 424. The rotor 426 consists of a cylindrical container-type yoke 427 formed of a resin as well as an annular rotor magnet 428 which is attached to the inner peripheral surface of this yoke 427 and is alternately polarized with S-poles and N-poles in the circumferential direction.

In the brushless motor 42 thus constructed, as alternate currents U, V, and W having different phases are supplied to the three stator coils 424, the directions of magnetic force with respect to the rotor magnet 428 are changed, thereby rotatively driving the rotor 426 and the rotating shaft 423. Further, as shown in FIG. 7, a plurality of, in this example three, Hall elements H1, H2, and H3, which are arranged at predetermined intervals along the circumferential direction of the rotor 426, are disposed and supported on the printed circuit board 45. When the rotor magnet 428 is rotated together with the rotor 426, the magnetic field in the Hall elements H1, H2, and H3 undergoes change, so that on- and off-states of the Hall elements H1, H2, and H3 are changed.

Thus the Hall elements H1, H2, and H3 are arranged to output pulse signals corresponding to the rotation period of the rotor 426.

A first gear 441 is formed of a resin integrally with the yoke 427 of the rotor 426. This first gear 441 is arranged as a part of the gear mechanism 44 and to rotatively drive the rotating output shaft 448 in a decelerating manner. Namely, the gear mechanism 44 is comprised of, in addition to the first gear 441, a second gear 443 which is rotatably supported on a first fixed shaft 442 supported by the second hollow boss 415; a third gear 445 which is rotatably supported on a second fixed shaft 444 supported by the third hollow boss 416; and a sector gear 447 which is rotatably supported on a third fixed shaft 446 supported by the fourth hollow boss 417 and is formed integrally with the rotating output shaft 448. These gears are respectively formed of a resin. As shown in FIGS. 5 and 6, the second gear 443 has a second large-diameter gear 443a and a second small-diameter gear 443b which are formed as a unit in the axial direction. The second large-diameter gear 443a meshes with the first gear 441. Further, the third gear 445 has a third large-diameter gear 445a and a third small-diameter gear 445b which are formed as a unit in the axial direction. The third large-diameter gear 445a meshes with the second small-diameter gear 443b. Furthermore, the third small-diameter gear 445b meshes with the sector gear 447. As a result, the torque of the first gear 441, which is rotated integrally with the rotor 427 of the brushless motor 42, is decelerated and transmitted to the rotating output shaft 448 through the second gear 443, the third gear 445, and the sector gear 447. Further, a pair of stoppers 419, against which respective ends of the sector gear 447 are respectively brought into colliding contact, are projectingly formed on the inner surface of the lower half 41D on both sides in the rotating direction of the sector gear 447. The arrangement provided is such that the range of the total angle of rotation of the sector gear 447, i.e., the range of the total angle of rotation of the rotating output shaft 448, is restricted by these stoppers 419. It should be noted that the range of the total angle of rotation of the sector gear 447 is designed to be slightly larger than the range of the total angle of rotation of the projector lamp 30 which is restricted by the projection 307 and the stoppers 317.

Figure 8:
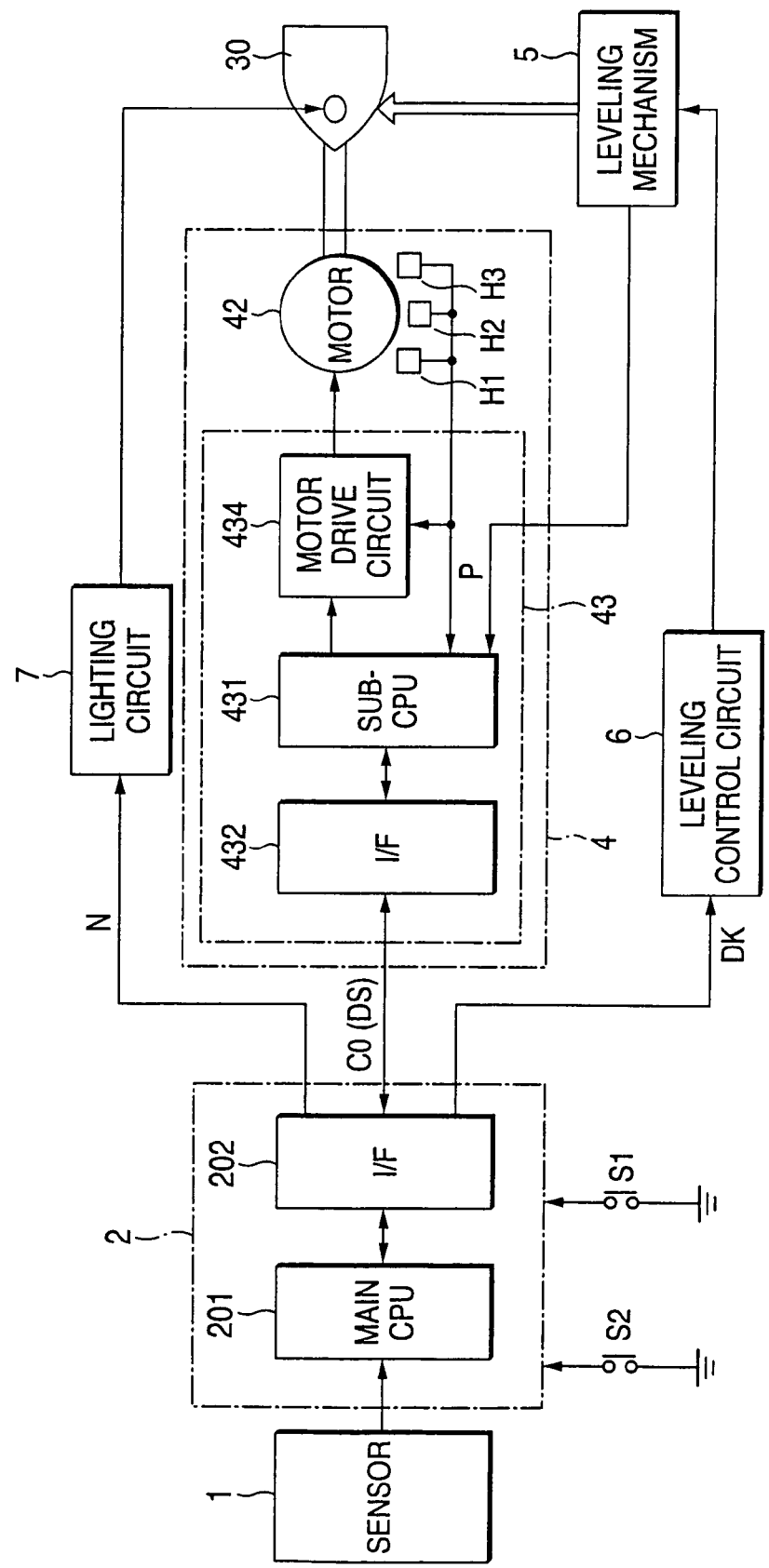
FIG. 8 is a block circuit diagram illustrating the circuit configuration of the AFS.

FIG. 8 is a block circuit diagram illustrating the electric circuit configuration of the lighting system including the ECU 2 and the actuator 4. It should be noted that the actuator 4 is installed in each of the left and right swivel lamps 3R and 3L of the automobile, and two-way communication is made possible with respect to the ECU 2. The ECU 2 includes a main CPU 201 for effecting processing in accordance with a predetermined algorithm on the basis of information from sensors 1 and for outputting a required control signal C0, as well as an interface (hereafter referred to I/F) circuit 202 for outputting the control signal C0 between the main CPU 201 and the actuator 4. Further, on and off signals of a lighting switch S1 provided in the automobile are made capable of being inputted to the ECU 2. The lighting circuit 7, which is connected to an unillustrated vehicle-mounted power supply to supply electric power to the discharge bulb 304 of the projector lamp 30, is controlled by a control signal N on the basis of the turning on and off of this lighting switch S1, thereby permitting the switching on and off of each of the swivel lamps 3R and 3L. In addition, by means of a leveling signal DK, the ECU 2 controls a leveling control circuit 6 for controlling the leveling mechanism 5 for vertically adjusting the optical axis of the bracket 31 supporting the projector lamp 30, so as to effect the optical axis adjustment of the projector lamp 30 accompanying a change in the height of the automobile. Incidentally, it goes without saying that the state of connection between these electric circuits and the power supply is turned on and off by an ignition switch S2 for turning on and off the electric system provided in the automobile.

In addition, the control circuit 43, which is arranged on the printed circuit board 45 installed in the actuator 4 provided in each of the left and right swivel lamps 3R and 3L of the automobile, is comprised of an IF circuit 432 for the input and output of signals with respect to the ECU 2; a sub CPU 431 for effecting processing in accordance with a predetermined algorithm on the basis of the signal inputted from the I/F circuit 432 and pulse signals P outputted from the Hall elements H1, H2, and H3; and a motor drive circuit 434 serving as a rotatively driving means for rotatively driving the brushless motor 42. Here, a left-right deflection angle signal DS for the swivel lamps 3R and 3L is outputted from the ECU 2 as part of the aforementioned control signal C0, and is inputted to the actuator 4.

Figure 9:
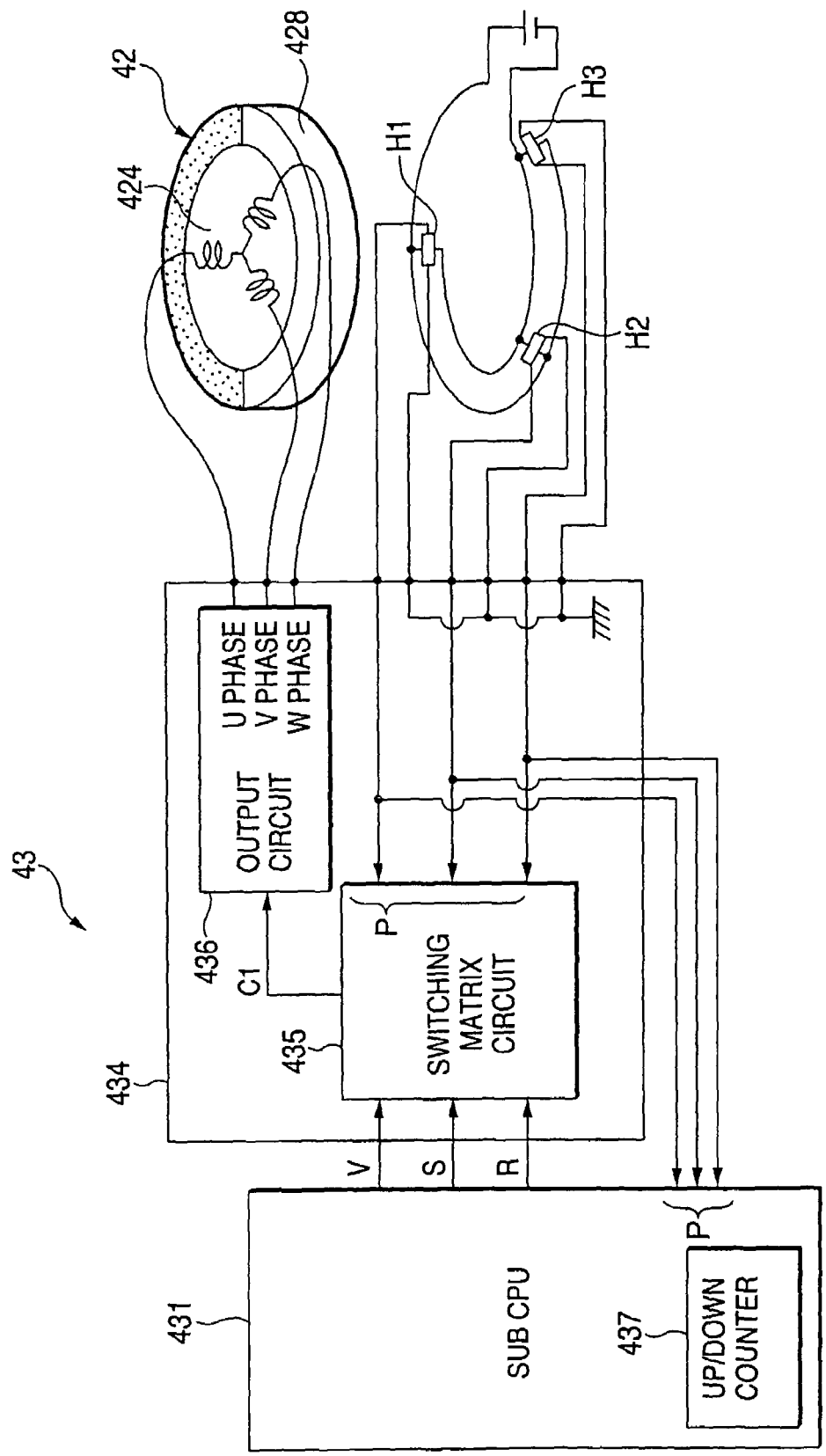
FIG. 9 is a circuit diagram illustrating the circuit configuration of the actuator.

FIG. 9 is a circuit diagram schematically illustrating the motor drive circuit 434 of the control circuit 43 and the brushless motor 42 in the actuator 4. The motor drive circuit 434 is comprised of a switching matrix circuit 435 to which a speed control signal V, a start/stop signal S, a forward/reverse rotation signal R are respectively inputted as control signals from the sub CPU 431 of the control circuit 43, and to which pulse signals P from the three Hall elements H1, H2, and H3 are inputted, as well as an output circuit 436 for adjusting the phases of three-phase (U phase, V phase, and W phase) power supplied to the three pairs of coils of the stator coils 424 of the brushless motor 42 upon receipt of an output from this switching matrix circuit 435. In this motor drive circuit 434, upon supplying the power of the U phase, V phase, and the W phase to the stator coils 424, the magnet rotor 428 rotates, and the yoke 427 integral therewith, i.e., the rotor 426 and the rotating shaft 323 rotate. When the magnet rotor 428 rotates, the Hall elements H1, H2, and H3 detect the change of the magnetic field and outputs the pulse signals P, and these pulse signals P are inputted to the switching matrix circuit 435. As the switching operation is effected by the output circuit 436 at the timing of each pulse signal in the switching matrix circuit 435, thereby continuing the rotation of the rotor 426.

The switching matrix circuit 435 outputs to the output circuit 436 the required control signal C1 on the basis of the speed control signal V, the start/stop signal S, the forward/reverse rotation signal R from the sub CPU 431. Upon receipt of this control signal C1, the output circuit 436 adjusts the phases of the three-phase power supplied to the stator coils 424, so as to control the start and stop of the rotating operation, the rotating direction, and the rotating speed of the brushless motor 42. In addition, portions of the pulse signals P outputted from the Hall elements are respectively inputted to the sub CPU 431 to recognize the state of rotation of the brushless motor 42. Here, an up/down counter 437 is incorporated in the sub CPU 431, and as the up/down counter 437 counts the pulse signals from the Hall elements H1, H2, and H3, its count value is made to correspond to the rotational position of the brushless motor 42.

Figure 1:
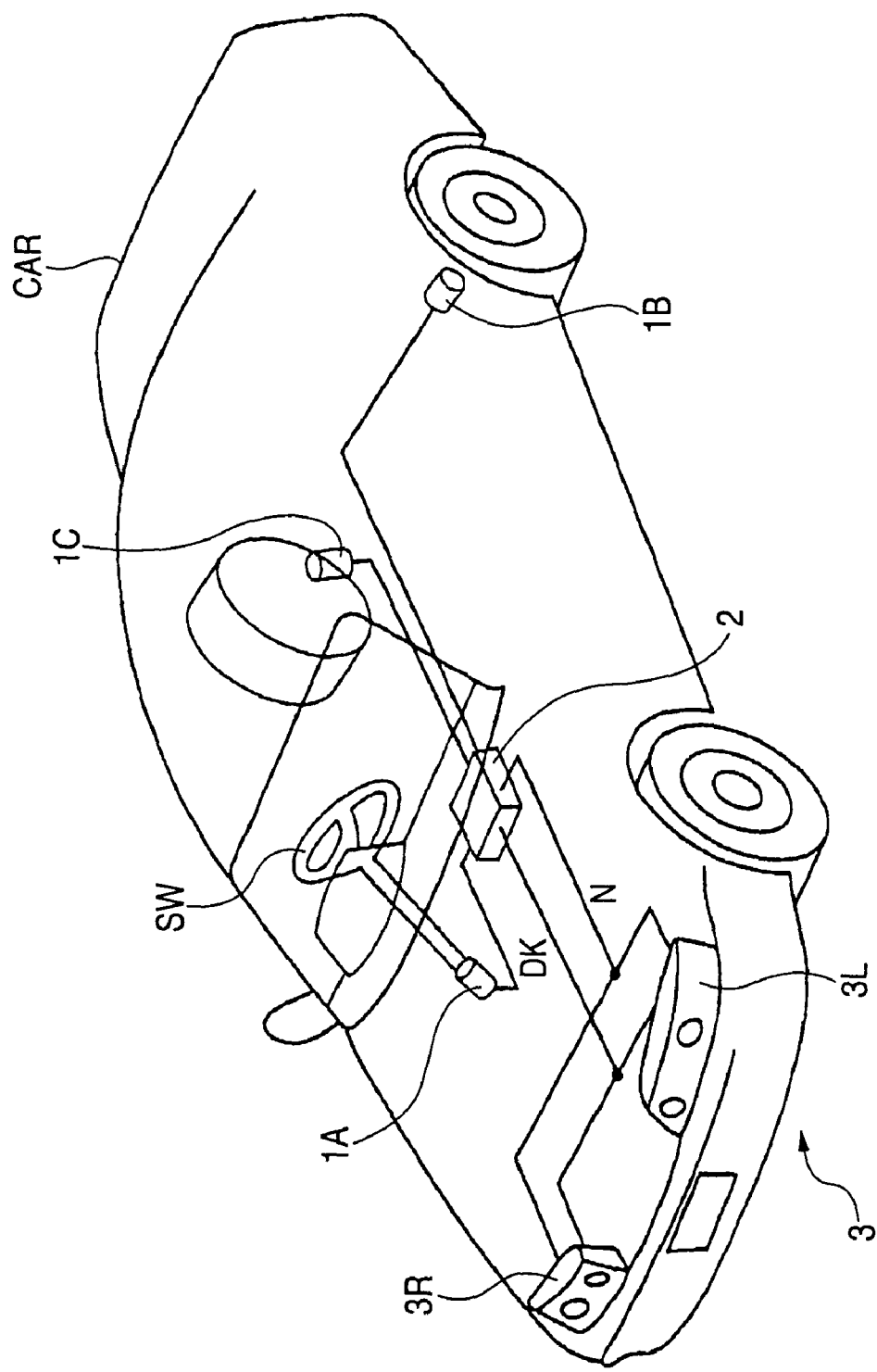
FIG. 1 is a diagram illustrating a conceptual construction of an AFS.

According to the above-described configuration, in the state in which the ignition switch S2 is turned on, and the lighting switch S1 is turned on, information on such as the steering angle of a steering wheel SW of the automobile, the speed of the automobile, the height of the automobile, and the like is inputted to the ECU 2 from the sensors 1 disposed in the automobile as shown in FIG. 1, the ECU 2 effects arithmetic operation by the main CPU 201 on the basis of the inputted sensor outputs, calculates the left-right deflection angle signal DS of the projector lamps 30 in the swivel lamps 3R and 3L of the automobile, and inputs it to the actuators 4 of both swivel lamps 3R and 3L. In each actuator 4, the sub CPU 431 effects arithmetic operation on the basis of the inputted left-right deflection angle signal DS, calculates a signal corresponding to that left-right deflection angle signal DS, and outputs it to the motor drive circuit 434 so as to rotatively drive the brushless motor 42. Since the rotatively driving force of the brushless motor 42 is decelerated by the gear mechanism 44 and is transmitted to the rotating output shaft 448, the projector lamp 30 connected to the rotating output shaft 448 rotates horizontally, thereby deflecting the direction of the optical axis of each of the swivel lamps 3R and 3L to the left or the right. At the time of the rotating operation of this projector lamp 30, the deflection angle of the projector lamp 30 is detected from the angle of rotation of the brushless motor 42. Namely, as shown in FIG. 8, the sub CPU 431 detects the deflection angle on the basis of at least one of the pulse signals P (P1, P2, and P3) outputted from the three Hall elements H1, H2, and H3) provided for the brushless motor 42. Further, the sub CPU 431 compares the detection signal of the detected deflection angle with the left-right deflection angle signal DS inputted from the ECU 2, and effects feedback control of the rotational angle of the brushless motor 42 so that the two signals agree. Thus the direction of the optical axis of the projector lamp 30, i.e., the direction of the optical axis of each swivel lamp 3R, 3L can be controlled with high accuracy to the deflecting position which is set by the left-right deflection angle signal DS.

By such deflecting operation of the projector lamp 30, in each swivel lamp 3R, 3L, the deflected light which is emitted illuminates the left- or rightwardly oriented region deflected from the straightly advancing direction of the automobile. Hence, it becomes possible to illuminate not only the straightly advancing direction of the automobile but also the front side in the steered direction during the traveling of the vehicle, thereby making it possible to enhance the safe driving characteristic.

Figure 10:
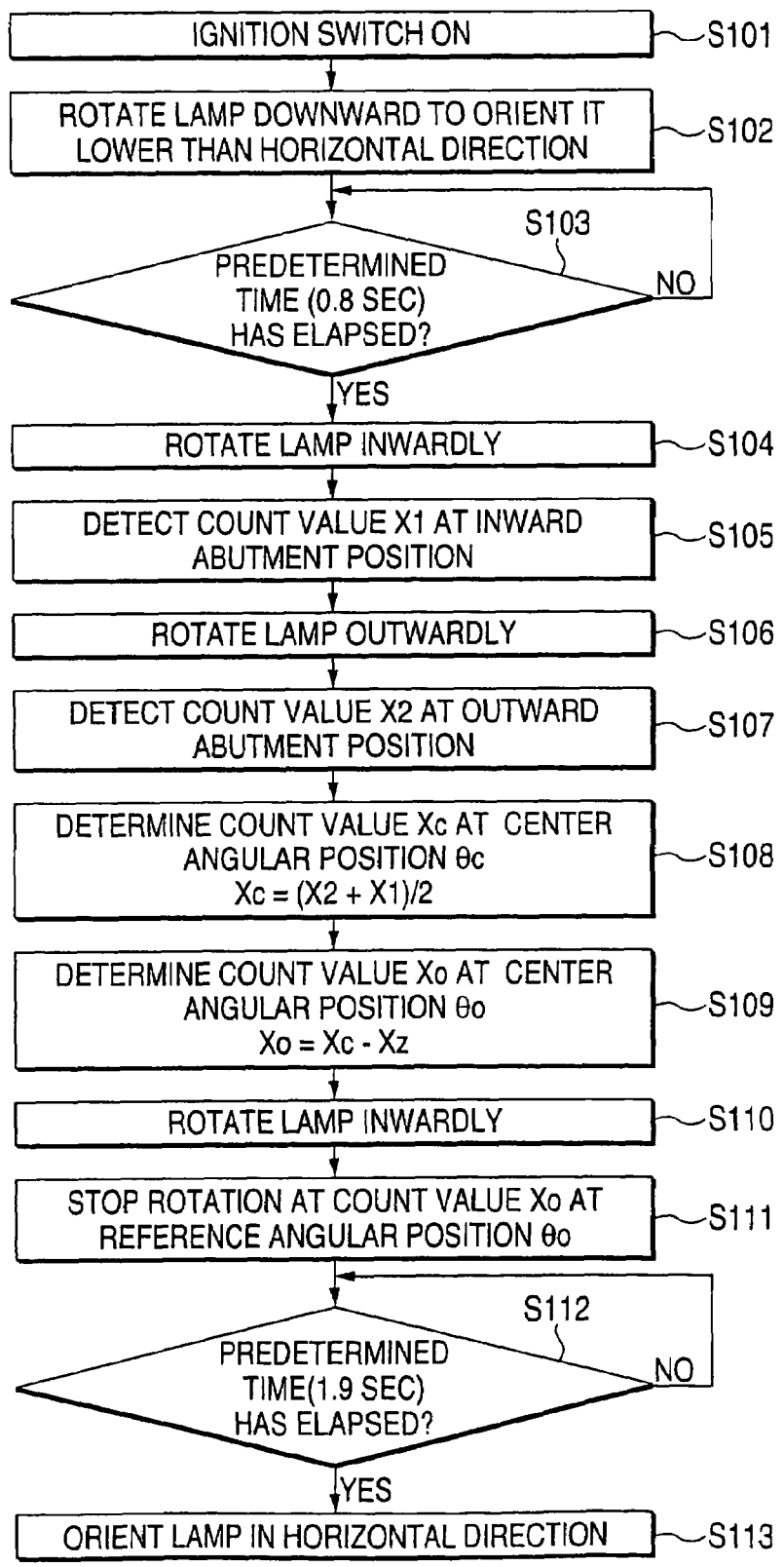
Figure 11A:
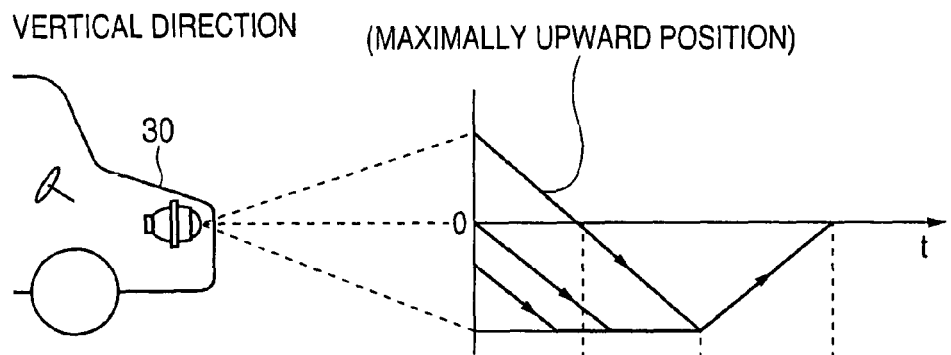
FIGS. 11A and 11B are diagram illustrating the rotating operation of the projector lamp and its timing.
Figure 11B:
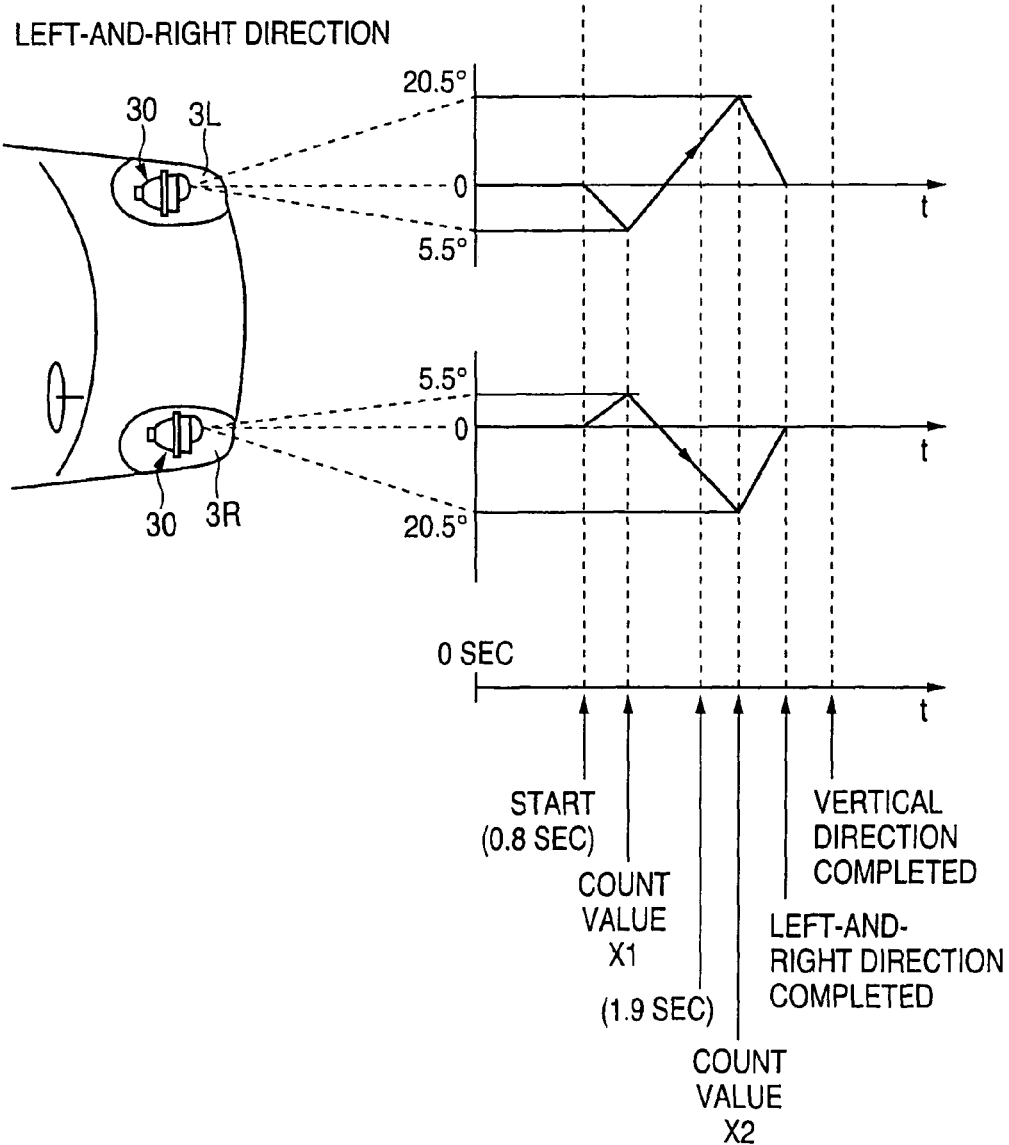

Here, when the ignition switch S2 is turned on, initialization processing is executed for setting the optical axis of each swivel lamp 3R, 3L to a predetermined angular position of deflection, i.e., a reference angular position, with respect to each of the vertical direction and the left-and-right direction. In this embodiment, it is assumed that the left and right swivel lamps 3R and 3L are respectively designed such that, with respect to the vertical direction, the deflecting operation is effected so as to be set to the horizontal direction, and, with respect to the left-and-right direction, the deflecting operation is effected within an angular range of about 5.5° toward the inward side and about 20.5° toward the outward side from the straightly advancing direction. FIG. 10 is a flowchart for explaining the flow of the initialization operation. In addition, FIGS. 11A and 11B are schematic diagrams illustrating the rotating operation in the vertical and left-and-right directions of the projector lamps as well as their respective timing charts. When the ignition switch S2 is turned on (S101), the sub CPU 431 first drives the leveling mechanism 5 by means of the leveling control circuit 6 to start the initialization setting of the vertical direction by the leveling mechanism 5. Namely, each bracket 31 is tilted in a lower direction than the horizontal direction by driving the leveling mechanism 5 (S102). As a result, the optical axis of the projector lamp 30 is deflected in the lower direction. At this time, when the projector lamp 30 was oriented in a maximally upward direction, the optical axis of the projector lamp 30 is oriented in the horizontal direction in a first predetermined time, i.e., in 0.85 second in this example, and is subsequently oriented in a lower direction than the horizontal direction. Accordingly, when the projector was at an angular position of deflection lower than the maximally upward angular position of deflection, the optical axis of the projector lamp 30 is oriented in the horizontal direction in a shorter time than the first predetermined time. Then, the optical axis is subsequently oriented in a lower direction than the horizontal direction. It goes without saying that when the optical axis was oriented lower than the horizontal direction from the outset, that lower oriented state is maintained as it is.

When a predetermined time has elapsed and the optical axis of the projector lamp is thus set in a state of being oriented lower than the horizontal direction (S103), the sub CPU 431 rotatively drives the brushless motor 42 in one direction by means of the motor drive circuit 434, and rotates the projector lamp 30 in the inward direction in the left-and-right direction from the present optical axis position (S104). It should be noted that in the following description the clockwise direction will be set positive and the counterclockwise direction negative. Then, a count value X1 is detected when the rotation of the projector lamp 30 has been stopped, i.e., when the projection 307 provided on the projector lamp 30 has abutted against one stopper 317 provided on the bracket 31, and the projector lamp 30 has been deflected to a maximum angular position of deflection $\theta_1$ (about −5.5° with respect to the straightly advancing direction) on one side (S105). Next, this time the brushless motor 42 is rotatively driven in the opposite direction, and the projector lamp 30 is rotated in the direction outwardly of the straightly advancing direction in the left-and-right direction (S106). Then, a count value X2 is detected when that rotation has been stopped, i.e., when the projection 307 has abutted against the stopper 317 on the opposite side, and the projector lamp 30 has been deflected to a position corresponding to a maximum angular position of deflection $\theta_2$ (about +20.5° with respect to the straightly advancing direction) on the opposite side (S107). It should be noted that the rotating direction of the brushless motor 42 in one direction and the opposite direction in the foregoing flow is effected at a relatively fast, fixed speed.

After that, a center angular position $\theta_c$ which is a central position between the maximum angular position of deflection $\theta_1$ on one side and the maximum angular position of deflection $\theta_2$ on the opposite side is determined. Namely, $$\theta_c = (\theta_2 + \theta_1)/2$$

In reality, however, the calculation of this center angular position $\theta_c$ employs an arithmetic operation using the count value X1 of the pulse signals at the time of abutment in the inward direction and the count value X2 of the pulse signals at the time of abutment in the opposite direction (S108). Namely, the count value Xc at the center angular position $\theta_c$ is expressed as $$Xc = (X2 + X1)/2$$

Next, using this center angular position $\theta_c$, an angular position oriented inward by a predetermined angle $\theta_z$ from this position is set as a reference angular position $\theta_o$, i.e., the angular position in the straightly advancing direction. Namely, $$\theta_o = \theta_c - \theta_z$$

In actual calculation, a count value Xz corresponding to a predetermined angle θz is subtracted from the computed count value Xc to determine the count value Xo at the center angular position (S109). Namely, the reference angular position Xo is expressed as $$Xo = Xc - Xz$$

After that, the brushless motor 42 is rotatively driven again in one direction from the outer abutment position obtained in Step S107 so as to start rotating the projector lamp 30 in the inward direction (S110). At this time, the rotating speed of the brushless motor 42 is made faster than until then. Further, the rotation is continued until the count value Xo at the reference angular position $\theta_o$ obtained in Step S109 is reached, and the rotation of the brushless motor 42 is stopped when that count value Xo has been reached (S111). As a result, the optical axis of the projector lamp 30 can be set at the reference angular position $\theta_o$, i.e., in the straightly advancing direction, thereby permitting the initialization setting of the optical axis of the projector lamp 30.

Figure 12A:
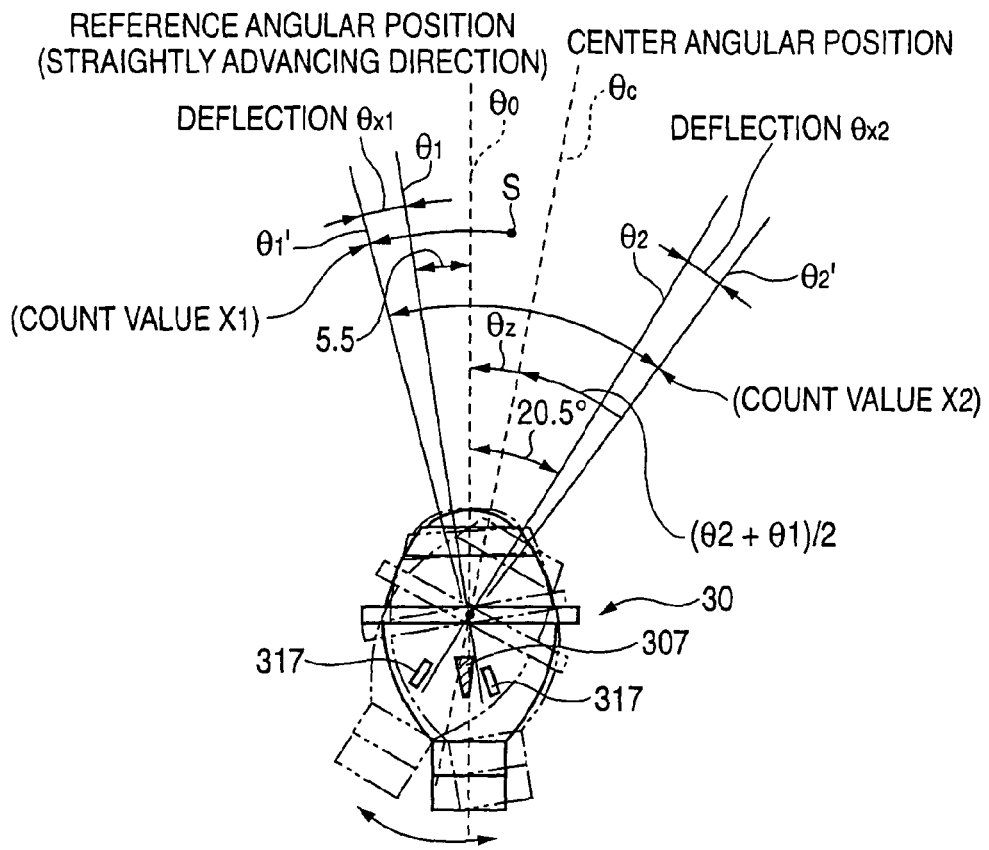
FIGS. 12A and 12B are schematic diagrams illustrating the offset of deflection in the initialization operation of a two-sided abutment system and a one-sided abutment system of the projector lamp, respectively.

Here, as shown in FIG. 12A, at the maximum angular position of deflection θ1 which is the abutment position on one side when the projector lamp 30 is rotated in the inward direction from a starting position S, deformation occurs in various parts of the actuator 4, the projector lamp 30, and the like owing to stress. Further, deformation accompanying a temperature change occurs owing to coefficients of thermal expansion of the materials of various parts. A deflection angle $\theta_{x1}$, occurs due to these causes. Similarly, a deflection angle $\theta_{x2}$ also occurs at the maximum angular position of deflection $\theta_2$ which is the abutment position on the other side when the projector lamp 30 is rotated in the outward direction. For this reason, in reality, the two maximum angular positions of deflection $\theta_1$ and $\theta_2$ becomes $\theta_{1'}$ and $\theta_{2'}$, respectively, owing to these deflection angles.

$$\theta_{1'} = \theta_1 - \theta_{x1}$$

$$\theta_{2'} = \theta_2 + \theta_{x2}$$

Accordingly, if the arithmetic operation of Xc in Step S108 is performed by using $\theta_{1'}$ and $\theta_{2'}$, the center angular position $\theta_c$ becomes as follows:

$$\theta_c = (\theta_{2'} + \theta_{1'}) / 2$$
$$= [(\theta_2 + \theta_{x2}) + (\theta_1 - \theta_{x1})]/2$$
$$= [(\theta_2 + \theta_1) + (\theta_{x2} - \theta_{x1})]/2$$
$$= (\theta_2 + \theta_1)/2 + (\theta_{x2} - \theta_{x1})/2$$
$$= \theta_c + (\theta_{x2} - \theta_{x1})/2$$

Accordingly, the value of $(\theta_{x2} - \theta_{x1})/2$ becomes the error.

Thus, since ½ of the difference between the deflection angle $\theta_{x2}$ in the outward direction and the deflection angle $\theta_{x1}$ in the inward direction occurs as the error, errors in the setting of the center angular position $\theta_c$ and the reference angular position $\theta_o$ become extremely small. In particular, in this example, the deflection angle θx1 in the inward direction and the deflection angle $\theta_{x2}$ in the outward direction respectively concern the identical actuator and projector lamp. Moreover, since the rotational speed of the brushless motor 42 in the meantime is fixed, the respective deflection angles $\theta_{x1}$ and $\theta_{x2}$ become substantially equal. Accordingly, in this case, the error based on the deflection angles $\theta_{x1}$ and $\theta_{x2}$ become substantially zero. Hence, it can be appreciated that it is possible to obtain extremely high setting accuracy at the reference angular position $\theta_o$.

Thus, at the time of setting the reference angular position of the projector lamp 30 in the left-and-right direction, since the two-sided abutment system is adopted in which the projector lamp 30 is rotated both in one direction and in the opposite direction for abutment, it becomes possible to offset the deflection angle occurring at the time of each abutment. Hence, the optical axis of the projector lamp 30 can be set to the reference angular position with high accuracy irrespective of the deflection due to the stress in the actuator 4 and the projector lamp 30 and a change in the deflection due to a temperature change.

While the above-described initialization of the optical axis of the projector lamp 30 in the left-and-right direction is being carried out, the sub CPU 431 holds the optical axis of the projector lamp 30 at the maximally downward deflection angle by means of the leveling mechanism 5. Further, at a predetermined timing, i.e., at a point of timing a second predetermined time prior to the completion of the setting of the reference angular position in the left-and-right direction, i.e., in this example, in 1.9 second (S112) after starting the downward deflection of the optical axis of the projector lamp 30 by the leveling mechanism 5, the sub CPU 431 controls the leveling mechanism 5 by means of the leveling control circuit 6, and rotates the projector lamp 30 upward so as to orient the optical axis in the horizontal direction (S113). Accordingly, when the optical axis is oriented in the horizontal direction, since the optical axis of the projector lamp 30 is already oriented in the straightly advancing direction in which the light does not dazzle the driver of an oncoming vehicle or the like with respect to the left-and-right direction, the driver of the oncoming vehicle is not dazzled even in the case where the optical axis is set in the horizontal direction.

Figure 12B:
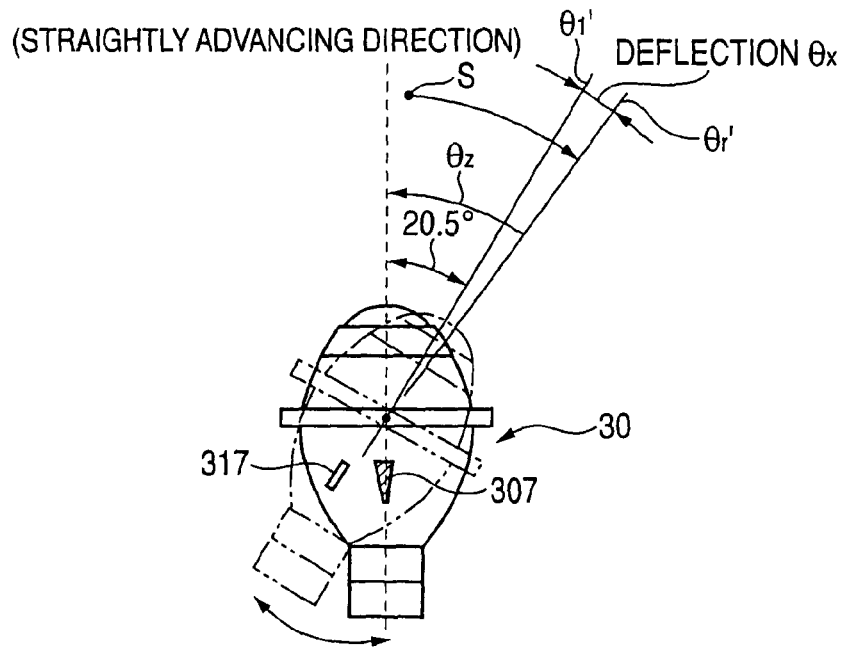

It should be noted that initialization based on a one-sided abutment system may be effected at the time of setting the reference angular position in the left-and-right direction of the projector lamp. In the initialization based on this one-sided abutment system, as shown in a conceptual diagram in FIG. 12B, the swivel lamp, i.e., the projector lamp 30 in this example, is rotated until its abutment in one direction from the initial position S, i.e., up to the position $\theta_r$, of the maximum deflection angle in the left-and-right direction in this example. Then, at the same time as the swivel lamp 30 is rotated from this abutment position θr in the opposite direction, the counting of the pulse signals from the Hall elements is started, and the rotation is stopped at the point of time when predetermined pulse signals have been counted. Accordingly, if the correlation of the count of the pulse signals with respect to the deflection angle of the projector lamp 30 is determined in advance, it becomes possible to rotate the projector lamp 30 from the abutment position θr by a predetermined deflection angle $\theta_z$ on the basis of the count of the pulse signals. Thus it becomes possible to set the projector lamp 30 to a predetermined reference angular position, i.e., in the straightly advancing direction in this example.

However, in the initialization based on such a one-sided abutment system, the position where the projector lamp abuts in one direction becomes the angular position of the setting start in setting, and the reference angular position for the straightly advancing direction is set by counting the pulse signals from this setting start position. Therefore, the abutment position when the projector lamp abuts in one direction becomes $\theta_{r'}$, and the drive move rotates excessively by a rotational angle $\theta_x$ due to the deflection occurring at the respective portions of the projector lamp and the actuator. Hence, there is a possibility that an error occurs in the angular position of the setting start by that portion. In addition, when consideration is given to the moduli of elasticity, coefficients of thermal expansion, and the like of resins and metals used in the swivel lamp and the actuator, since these values change due to the temperature, the amount of deflection at the time of abutment also changes in consequence of the temperature change. Hence, there is a possibility that a slight error occurs in the angular position of the setting start.

As described above, at the time of the setting of the position of the optical axis in the left-and-right direction, high setting accuracy is obtained in the both-sided abutment system irrespective of the temperature change. In the one-sided abutment system, however, since the setting operation can be effected easily as compared to the above-described two-sided abutment system, this one-sided abutment system may be adopted for a headlamp apparatus for a vehicle for which high accuracy is not required in the setting of the position of the optical axis.

It should be noted in the above-described embodiment the operation of the setting of the reference angular position in the left-and-right direction is started after the lapse of a first predetermined time subsequent to the starting of the operation of the setting of the reference angular position in the vertical direction. However, in the case of a configuration in which information on the deflection angle in the vertical direction of the projector lamp 30 is inputted from the leveling mechanism 5 to the sub CPU 431 to allow real-time recognition, a terminating point of time of the operation of the setting of the reference angular position in the left-and-right direction may be estimated, and the operation of rotating the optical axis of the projector lamp 30 upward toward the horizontal direction may be started on the basis of the result of this estimation.

Here, in the above-described embodiment, as for the deflection range in the left-and-right direction of the swivel lamp, the deflection angle in the inward direction is set to be smaller than the deflection angle in the outward direction with respect to the straightly advancing direction of the automobile. For this reason, the projector lamp is arranged to be rotated toward the outward side after being rotated toward the inward side. However, in the case of a headlamp apparatus in which the inward and outward deflection angles are equal, i.e., in the case of a headlamp in which the reference position is set at the center between the inward and outward deflection angles, the order of the rotating direction may be arbitrary.

It should be noted that, as for the counting of the pulse signals in the up/down counter 437 of the sub CPU 431, counting may be effected with any of the pulse signals P1, P2, and P3 of the Hall elements H1, H2, and H3. Further, in a case where the period of the pulse signal from the Hall element is very short, counting may be effected after frequency-dividing the pulse signal.

In addition, although in the above-described embodiment an example has been shown in which the projector lamp making up the swivel lamp is applied to the headlamp for changing the optical axis of illumination by deflecting it in the left-and-right direction, the invention may be applied to a headlamp in which only the reflector is arranged to undergo deflection operation, or in which a virtual illuminating range is arranged to be changed by effecting the deflecting operation of an auxiliary reflector provided independently of a main reflector.

As described above, in the invention, there is provided deflection controlling means for effecting the operation of setting the optical axis of the headlamp by the left-right deflecting means at a time when the optical axis of illumination of the headlamp is in a state of being oriented in a lower direction than the horizontal direction by the vertically deflecting means. At the time of setting the optical axis position of the headlamp to a reference angular position, the operation of setting the optical axis by the left-right deflecting means is effected at a time when the optical axis of illumination of the headlamp is in a state of being oriented in a lower direction than the horizontal direction by the vertically deflecting means. Further, the operation of setting the optical axis by the vertically deflecting means is completed after completion of the operation of setting the optical axis by the left-right deflecting means. Therefore, the optical axis position of the headlamp is oriented in a lower direction than the horizontal direction by the vertically deflecting means until the optical axis position of the headlamp is set to the reference angular position by the left-right deflecting means. After the optical axis position of the headlamp is set to the reference angular position by the left-right deflecting means, the optical axis position is set to a reference position. Consequently, it is possible to prevent the headlamp from being deflected toward the oncoming vehicle side when the optical axis position is being oriented in the horizontal direction or in an upward direction. Hence, it is possible to prevent the dazzling of the driver of an oncoming vehicle during the operation of setting the optical axis position, thereby making it possible to ensure appropriate control of the AFS.

What is claimed is:

1. A vehicle headlamp apparatus comprising:
   left-right deflecting means for deflecting an optical axis of illumination of a headlamp in a left-and-right direction in correspondence with a steering angle of a vehicle;
   vertically deflecting means for deflecting the optical axis of illumination of said headlamp in a vertical direction; and
   deflection controlling means for effecting the operation of setting the optical axis of said headlamp by said left-right deflecting means at a time when the optical axis of illumination of said headlamp is in a state of being oriented in a lower direction than the horizontal direction by said vertically deflecting means.

2. A vehicle headlamp apparatus according to claim 1, wherein the left-right deflecting means includes a drive motor which drives the headlamp in the left-and-right direction, and
   the deflection controlling means includes a sensing element which outputs pulse signals in response to rotation of the drive motor, and an up-down counter which counts number of the pulses.

3. A vehicle head lamp apparatus according to claim 2, wherein the deflection controlling means sets the optical axis of said headlamp based on a rotation range is obtained from a first counting number of the up-down counter when the drive motor is rotated in one direction and a second counting number of the up-down counter when rotated in the opposite direction.

4. A method of setting an optical axis position of a vehicle headlamp apparatus including left-right deflecting means for deflecting an optical axis of illumination of a headlamp in a left-and-right direction in correspondence with a steering angle of a vehicle and vertically deflecting means for deflecting the optical axis of illumination of said headlamp in a vertical direction, the method comprising the steps of:

effecting the operation of setting the optical axis by said left-right deflecting means at a time when the optical axis of illumination of said headlamp is in a state of being oriented in a lower direction than the horizontal direction by said vertically deflecting means at the time of setting the optical axis position of said headlamp to a reference angular position; and completing the operation of setting the optical axis by said vertically deflecting means after completion of the operation of setting the optical axis by said left-right deflecting means.

5. The method of setting an optical axis position according to claim 4, wherein after starting the operation of said vertically deflecting means, the operation of said left-right deflecting means is started after the lapse of a first predetermined time.

6. The method of setting an optical axis position according to claim 4, wherein after starting the deflecting operation of said vertically deflecting means in a downwardly oriented manner, the deflecting operation of said vertically deflecting means in an upwardly oriented manner is started after the lapse of a second predetermined time.

7. The method of setting an optical axis position according to claim 5, wherein after starting the deflecting operation of said vertically deflecting means in a downwardly oriented manner, the deflecting operation of said vertically deflecting means in an upwardly oriented manner is started after the lapse of a second predetermined time.

* * * * *